(12) United States Patent
Kakimi et al.

(10) Patent No.: US 9,190,817 B2
(45) Date of Patent: Nov. 17, 2015

(54) ELECTRICAL JUNCTION BOX

(71) Applicant: Yazaki Corporation, Tokyo (JP)

(72) Inventors: Takaaki Kakimi, Makinohara (JP); Sunsoku I, Makinohara (JP)

(73) Assignee: Yazaki Corporation, Tokyo (JP)

( * ) Notice: Subject to any disclaimer, the term of this patent is extended or adjusted under 35 U.S.C. 154(b) by 15 days.

(21) Appl. No.: 14/194,887

(22) Filed: Mar. 3, 2014

(65) Prior Publication Data

US 2014/0246216 A1   Sep. 4, 2014

(30) Foreign Application Priority Data

Mar. 4, 2013 (JP) ................. 2013-041771

(51) Int. Cl.
*H02G 3/08* (2006.01)

(52) U.S. Cl.
CPC .................... *H02G 3/081* (2013.01)

(58) Field of Classification Search
CPC ....................................... H02G 3/081
USPC ............................................. 174/50
See application file for complete search history.

(56) References Cited

FOREIGN PATENT DOCUMENTS

JP    2012-055108 A    3/2012

*Primary Examiner* — Dhirubhai R Patel
(74) *Attorney, Agent, or Firm* — Locke Lord LLP (57) ABSTRACT

Provided is an electrical junction box which can easily attach a block to an inner side of a frame without the need for visual positioning of a lock portion of the block and a lock receive portion of the frame. An electrical junction box includes a frame and a block to be attached to an inner side of the frame. The block includes a lock portion, and the frame includes a lock receive portion to which the lock portion engages. Four faces of the frame arranged to surround the block include a tapered face for guiding the block to a proper attachment position. The frame includes a double wall including an outer wall and an inner wall, and a rib connecting the outer wall and the inner wall. The rib is extended above the inner wall, and the tapered face is provided to an extended portion of the rib.

2 Claims, 8 Drawing Sheets

ELECTRICAL JUNCTION BOX

CROSS REFERENCE TO RELATED APPLICATIONS

This application is on the basis of Japanese Patent Application No. 2013-041771, the contents of which are hereby incorporated by reference.

TECHNICAL FIELD

The present invention relates to an electrical junction box to be mounted on an automobile.

BACKGROUND ART

Figure 7:
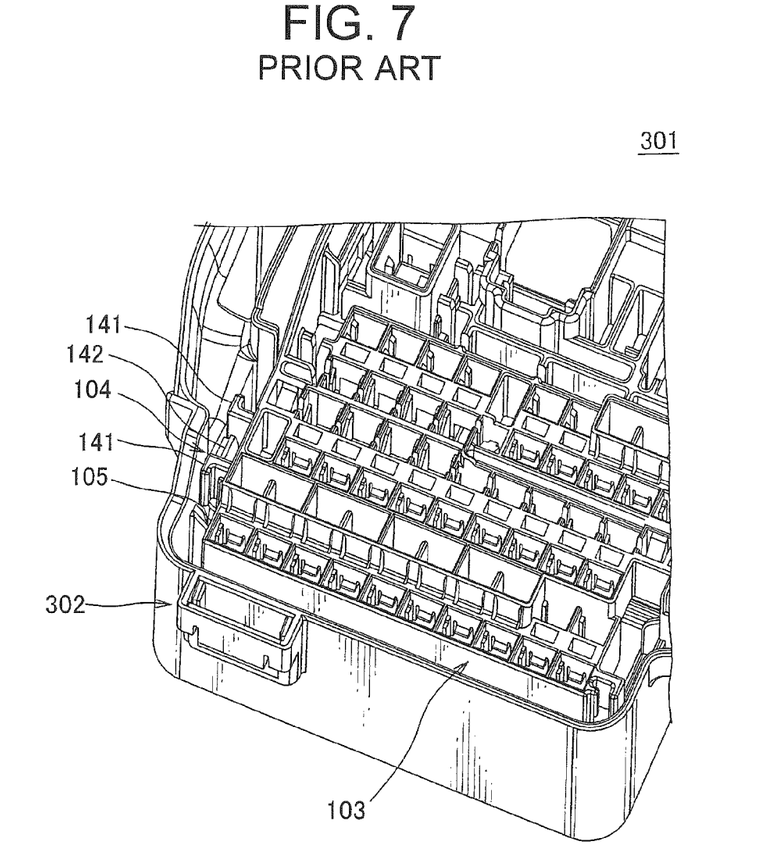
FIG. 7 is a perspective view of a conventional electrical junction box and shows a state in middle of attaching a block to a frame.
Figure 8:
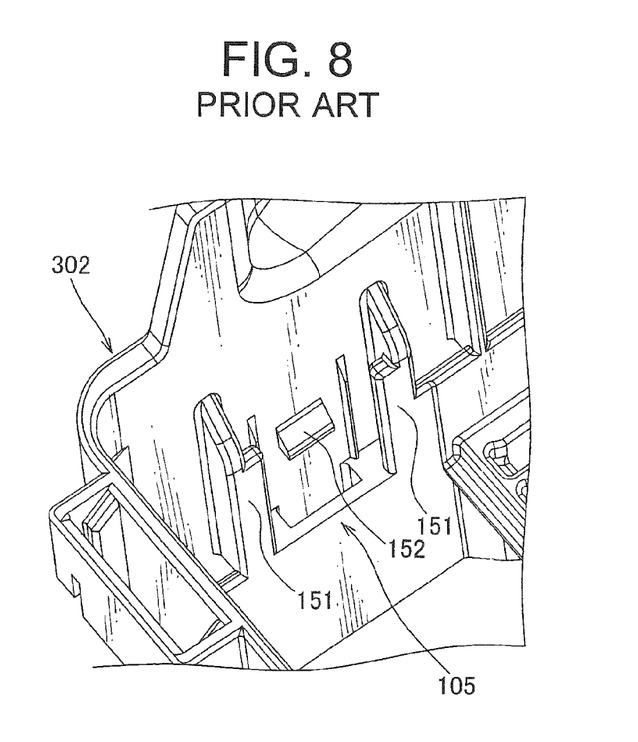
FIG. 8 is a perspective view of the frame shown in FIG. 7.

There are various types of electrical junctions boxes to be mounted on an automobile. One example of such electrical junction box includes a frame and a block to be attached to an inner side of the frame, as shown in FIGS. 7, 8 (refer to Patent Literature 1). FIG. 7 is a perspective view of a conventional electrical junction box in the middle of attaching the block to the frame. FIG. 8 is a perspective view of the frame shown in FIG. 7.

An electrical junction box 301 shown in FIG. 7 includes a frame 302, a block 103 arranged to be attached to an inner side of the frame 302, and various components such as a relay, fuse, bus bar or the like to be attached to the block 103.

The block 103 is made of synthetic resin and formed into a block-like shape, and is provided with a plurality of component attachment portions to which the various components mentioned above are attached. Also, a plurality of lock portions 104 is provided to a side face of the block 103. Each lock portion 104 includes a pair of rails 141 arranged parallel to each other and a projection 142 provided between the pair of rails 141.

The frame 302 is made of synthetic resin and formed into a frame-like shape. A plurality of lock receive portions 105 to which the lock portion 104 engages is provided to an inner face of the frame 302. As shown in FIG. 8, each lock receive portion 105 includes a pair of rails 151 arranged parallel to each other and a projection 152 provided between the pair of rails 151.

The lock portion 104 is engaged to the lock receive portion 105 by the pair of rails 141 being inserted between the pair of rails 151 of the lock receive portion 105 and the projection 142 being moved over the projection 152 of the lock receive portion 105 and caught to the projection 152. The block 103 is attached to the frame 302 by making the plurality of lock portions 104 engaged to the corresponding plurality of lock receive portion 105.

CITATION LIST

Patent Literatures

Patent Literature 1: Japan Patent Application Publication No. 2012-55108

SUMMARY OF INVENTION

Problem to be Solved

However, the above-mentioned conventional electrical junction box 301 has a problem that, when attaching the block 103 to the frame 302, a visual positioning of the pair of rails 141 and the pair of rails 151 is required to ensure that the pair of rails 141 is inserted between the pair of rails 151, causing the operation to be complicated.

In view of the above-mentioned problem, an object of the present invention is to provide an electrical junction box which can easily attach a block to an inner side of a frame without the need for visual positioning of a lock portion of the block and a lock receive portion of the frame.

Solution to Problem

In order to achieve the above-described object, the present invention provides, in a first aspect, an electrical junction box including a frame and a block to he attached to an inner side of the frame, wherein the block is provided with a lock portion, and wherein the frame is provided with a lock receive portion to which the lock portion engages, wherein the frame includes four faces arranged to surround the block, and among the four faces, at least two faces intersecting to each other are provided with a tapered face which guides the block to a proper attachment position.

The present invention provides, in a second aspect, the electrical junction box according to the first aspect, wherein the frame includes a double wall constituted of an outer wall and an inner wall, and a rib connecting the outer wall and the inner wall, and wherein the rib is extended further above than or further below than the inner wall, and the tapered face is provided to an extended portion of the rib.

Advantageous Effects of Invention

According to the invention described in the first aspect, the at least two intersecting faces among the four faces arranged to surround the block are provided with the tapered face for guiding the block to a proper attachment position. Thus, the block is inserted to the inner side of the frame with the block being abutted on the tapered faces, thereby positioning the lock portion of the block and the lock receive portion of the frame to the proper position without the need for visual positioning of the lock portion of the block and the lock receive portion of the frame. Thus, the block can be easily attached to the inner side of the frame.

According to the invention described in the second aspect, the frame includes the double wall constituted of the outer wall and the inner wall, and the rib connecting the outer wall and the inner wall, and wherein the rib is extended further above than or further below than the inner wall, and the tapered face is provided to the extended portion of the rib. Thus, the tapered face can be provided without increasing the size of the frame.

DESCRIPTION OF EXEMPLARY EMBODIMENTS

In the following, "electrical connection box" according to one embodiment of the present invention is explained in reference to FIGS. 1-6.

Figure 1:
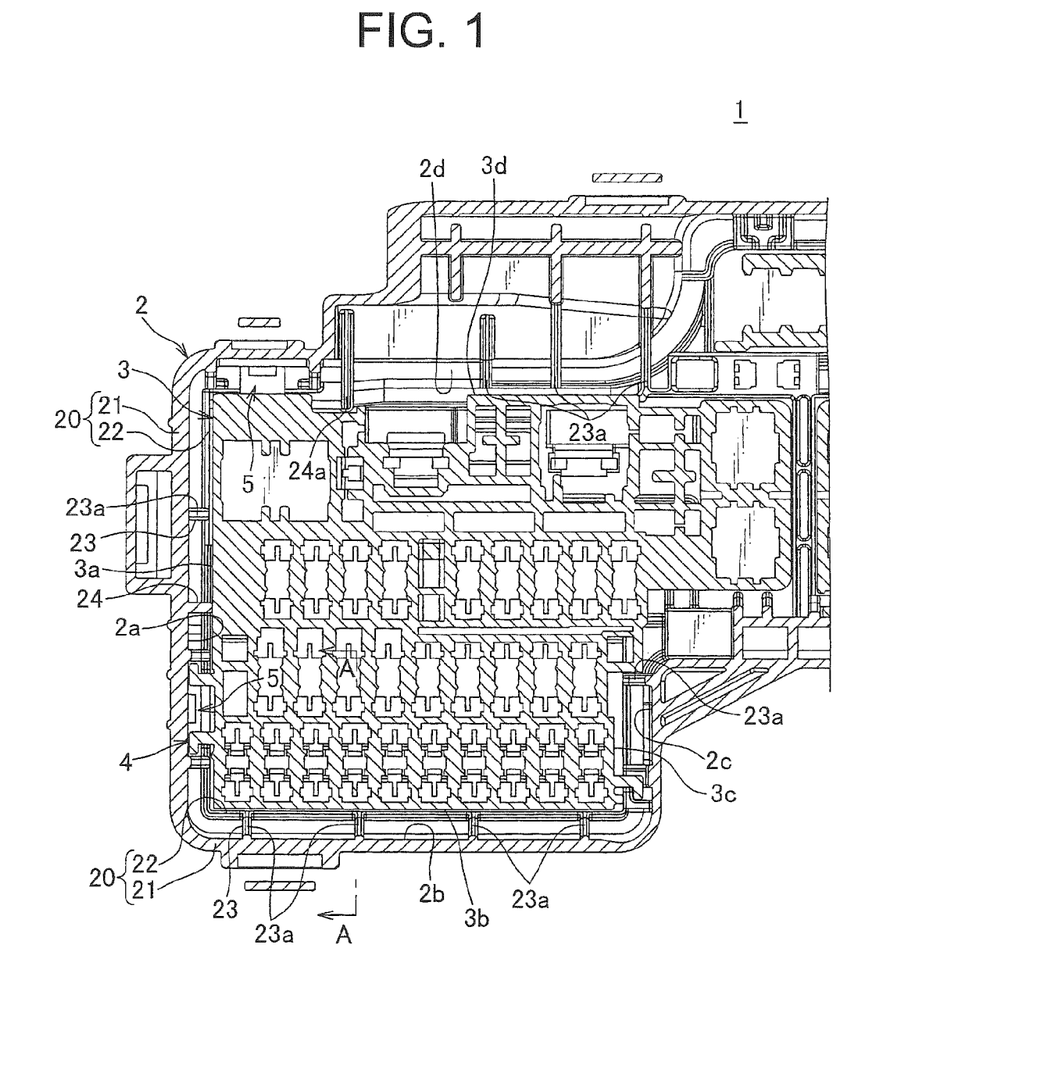
FIG. 1 is a cross-sectional view of an electrical junction box according to one embodiment of the present invention and shows a state in middle of attaching a block to a frame.

An electrical junction box 1 shown in FIG. 1 is arranged to be mounted on an automobile and includes a frame 2, a block 3 to be attached to an inner side of the frame 2, and various components such as a relay, fuse, bus bar or the like to be attached to the block 3. FIG. 1 is a cross-sectional view showing a state in middle of attaching the block 3 to the frame 2.

Figure 5:
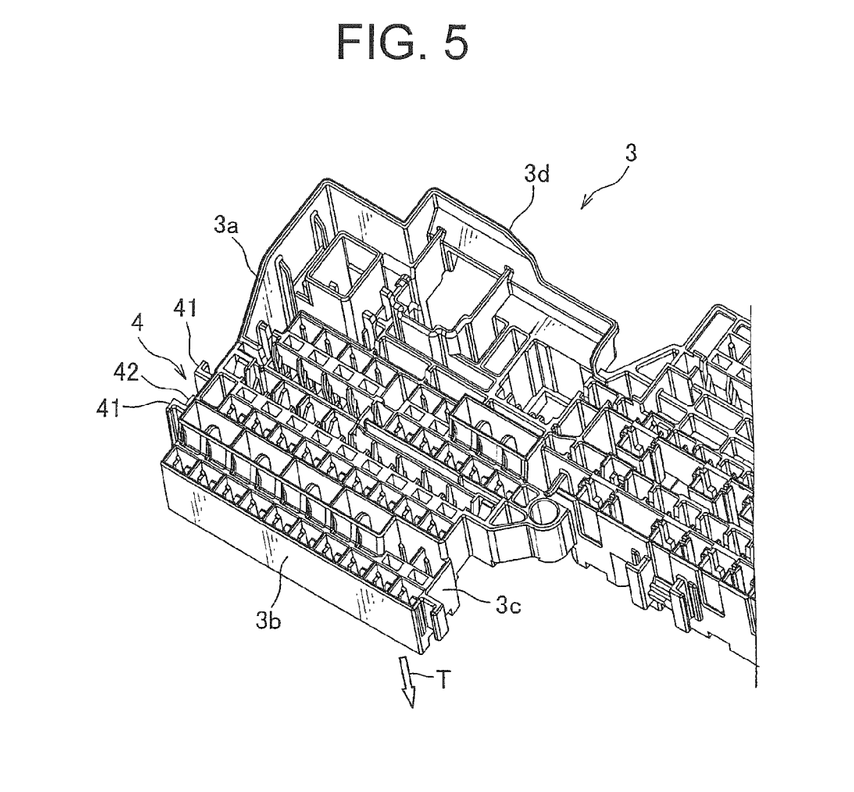
FIG. 5 is a perspective view of the block shown in FIG. 1.
Figure 6:
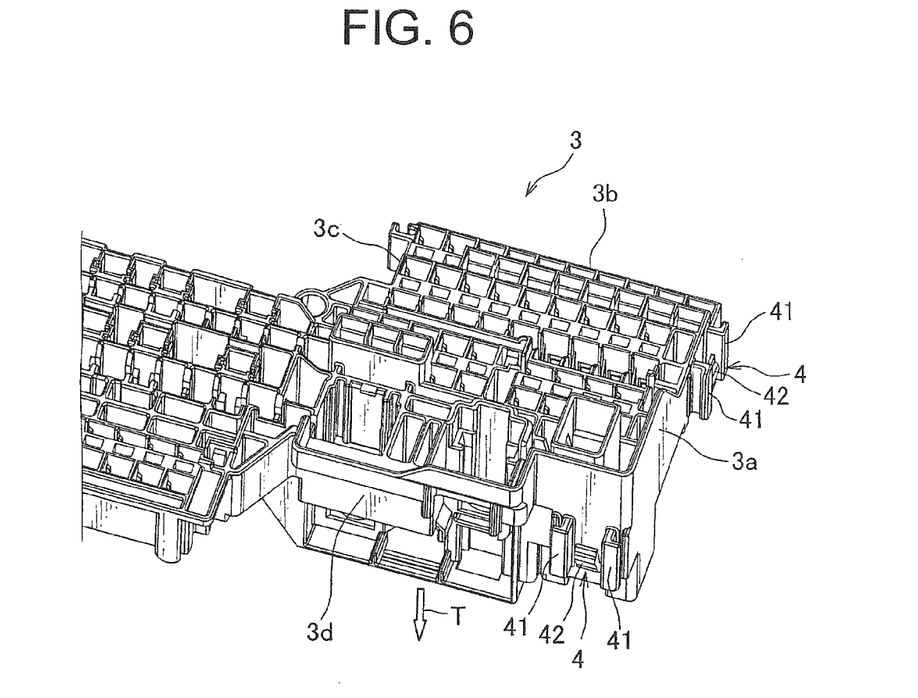
FIG. 6 is a perspective view of the block shown in FIG. 5 seen from an opposite side.

The block 3 is made of synthetic resin and formed into a block-like shape and is provided with a plurality of component attachment portions to which the various components mentioned above are attached. As shown in FIGS. 5 and 6, a plurality of lock portions 4 is provided to a side face of the block 3. Each lock portion 4 includes a pair of rails 41 arranged parallel to each other and a projection 42 provided between the pair of rails 41.

Figure 3:
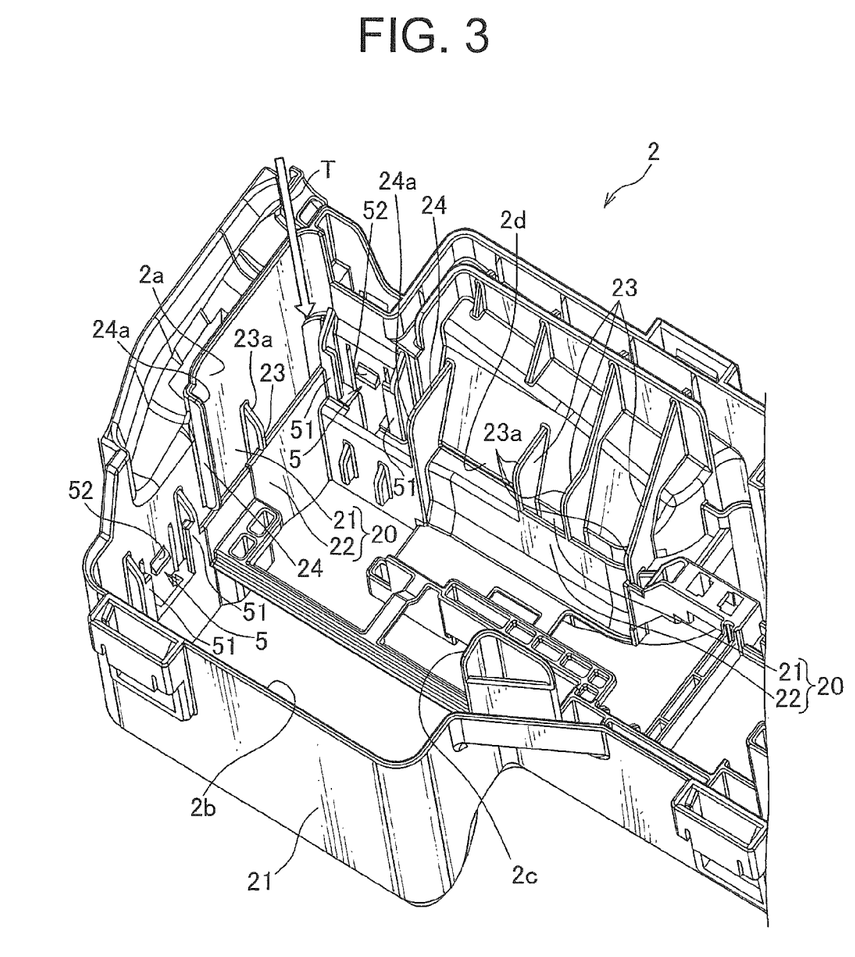
FIG. 3 is a perspective view of the frame shown in FIG. 1.
Figure 4:
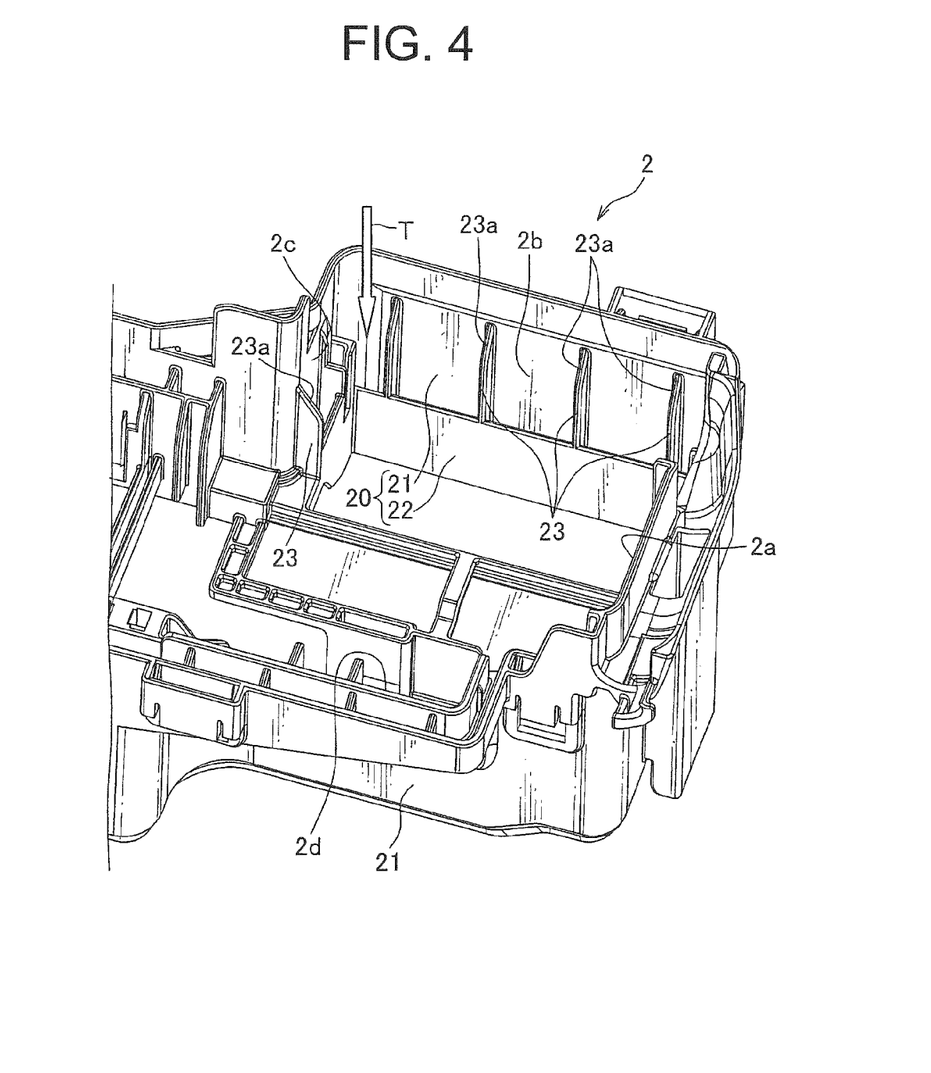
FIG. 4 is a perspective view of the frame shown in FIG. 3 seen from an opposite side.

The frame 2 is made of synthetic resin and formed into a frame-like shape. A plurality of lock receive portions 5 to which the lock portions 4 engage is provide to an inner face of the frame 2. As shown in FIG. 3, each lock receive portion 5 includes a pair of rails 51 arranged parallel to each other and a projection 52 provided between the pair of rails 51. Furthermore, as shown in FIGS. 3 and 4, the frame 2 includes a double wall 20 constituted of an outer wall 21 and an inner wall 22, a rib 23 connecting the outer wall 21 and the inner wall 22, and a rib 24 provided at an inner side of the outer wall 21. These ribs 23, 24 are provided to improve the rigidity of the frame 2.

The lock portion 4 is engaged to the lock receive portion 5 by the pair of rails 41 being inserted between the pair of rails 51 of the lock receive portion 5 and the projection 42 being moved over the projection 52 of the lock receive portion 5 and caught to the projection 52. The block 3 is attached to the frame 2 by making the plurality of lock portions 4 engaged to the corresponding plurality of lock receive portions 5. In FIGS. 2-6, an arrow T indicates an attachment direction in which the block 3 is attached to the frame 2.

Figure 2:
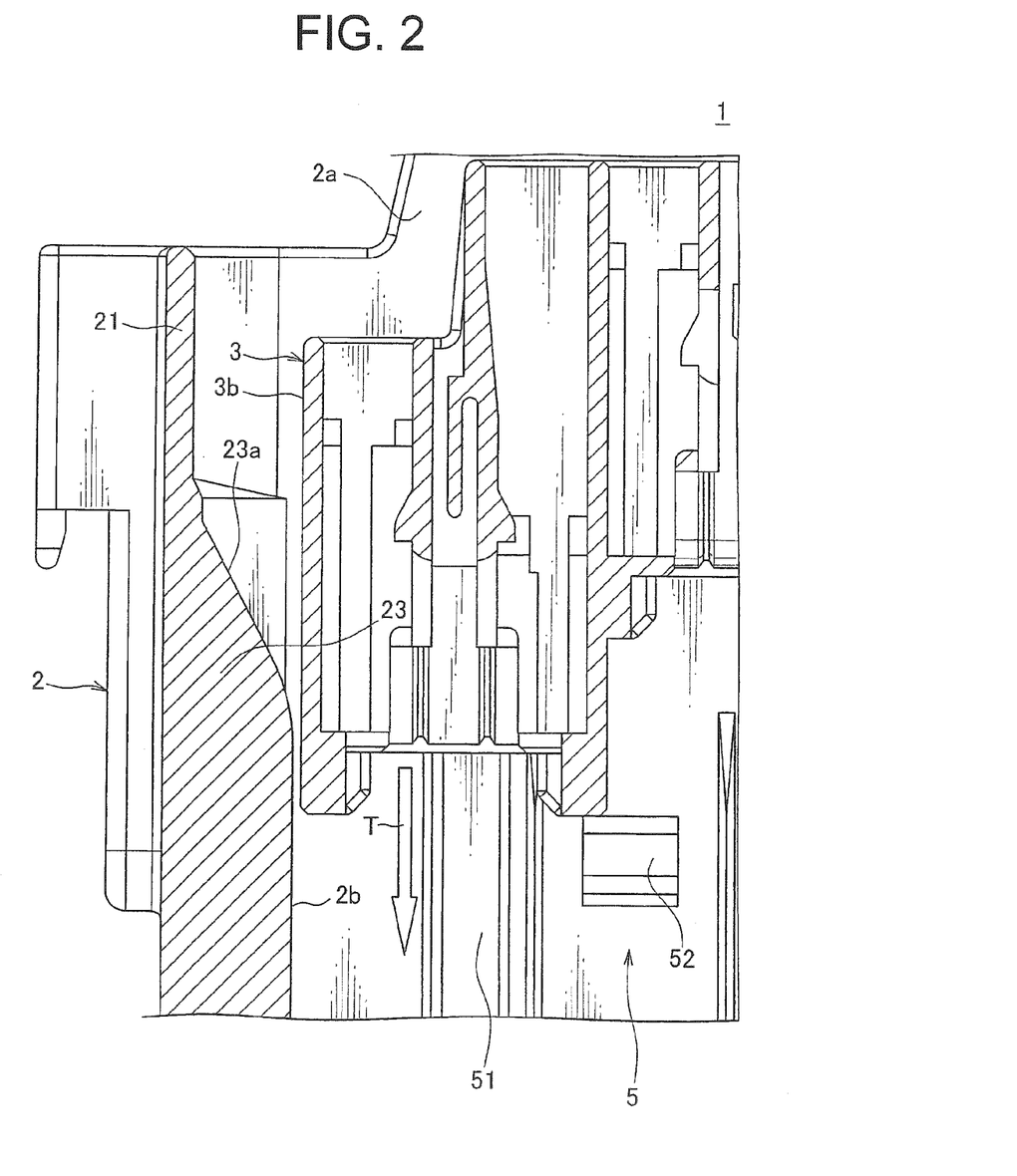
FIG. 2 is a cross-sectional view taken along a line A-A in FIG. 1.

As shown in FIGS. 2-4, the frame 2 includes four faces 2a, 2b, 2c, 2d arranged to surround the block 3, and these four faces 2a, 2b, 2c, 2d include a plurality of tapered faces 23a, 24a for guiding the block 3 to a proper attachment position. The face 2a of the frame 2 is arranged to be opposed to a side face 3a of the block 3. The face 2b of the frame 2 is arranged to be opposed to a side face 3b of the block 3. The face 2c of the frame 2 is arranged to be opposed to a side face 3c of the block 3. The face 2d of the frame 2 is arranged to be opposed to a side face 3d of the block 3.

The tapered face 23a is provided to the rib 23 mentioned above. The rib 23 is extended further above (i.e. in an upward direction in FIGS. 3, 4) than the inner wall 22 constituting the double wall 20, and the tapered face 3a is provided to this extended portion. The tapered face 24a is provided to the rib 24 mentioned above.

As shown in FIG. 2, for example, the tapered faces 23a, 24a are disposed at a position further above (i.e. in an upward direction in FIG. 2) the lock receive portion 5. Thus, when attaching the block 3 to the inner side of the frame 2, the block 3 abuts on the tapered faces 23a, 24a before the lock portion 4 starts to abut on the lock receive portion 5.

As explained above, for this electrical junction box 1, the four faces 2a, 2b, 2c, 2d of the frame 2 are provided with the plurality of tapered faces 23a, 24a. Thus, when attaching the block 3 to the inner side of the frame 2, the block 3 is inserted in the arrowed T direction while allowing the block 3 to abut on these tapered faces 23a, 24a, thereby positioning the lock portion 4 of the block 3 and the lock receive portion 5 of the frame 2 to the proper position without the need for visual positioning of the lock portion 4 of the block 3 and the lock receive portion 5 of the frame 2. Thus, the block 3 can be easily attached to the inner side of the frame 2. Furthermore, in this embodiment, the tapered face 23a is provided to an extended portion of the already existing rib 23, thus an increase in size of the frame 2 can be prevented.

In the embodiment described above, all of the four faces 2a, 2b, 2c, 2d of the frame 2 arranged to surround the block 3 are provided with the tapered faces 23a, 24a; however, in the present invention, this is not necessary as long as the tapered face for guiding the block to the proper attachment portion is provided to at least two faces intersecting each other of the four faces of the frame arranged to surround the block.

The embodiments described above are only representative embodiments, and the present invention is not limited to these. That is, the present invention can be modified and implemented in various ways without departing from the gist of the present invention.

REFERENCE SIGN LIST 1 electrical junction box
2 frame
3 block
4 lock portion
5 lock receive portion
20 double wall
21 outer wall
22 inner wall
23 rib
23a, 24a tapered face

The invention claimed is:

1. An electrical junction box comprising a frame and a block to be attached to an inner side of the frame, wherein the frame includes four faces arranged to surround the block, and wherein the block is provided with a lock portion including a pair of lock portion rails and a lock portion projection, and wherein at least one inner side of the frame is provided with a lock receive portion having a pair of lock receive rails to which the pair of lock portion rails engage and a lock receive projection to which the lock portion projection engages,
   wherein among the four faces, at least two faces intersecting to each other are provided with a tapered face which is slanted toward an inside of the frame and which guides the block to a proper attachment position.

2. The electrical junction box according to claim 1,
   wherein the frame includes a double wall constituted of an outer wall and an inner wall, arid a rib connecting the outer wall and the inner wall, and
   wherein the rib is extended further above than or further below than the inner wall, and the tapered face is provided to an extended portion of the rib.

* * * * *